United States Patent [19]
Silverman

[11] 3,984,805
[45] Oct. 5, 1976

[54] PARALLEL OPERATION OF SEISMIC VIBRATORS WITHOUT PHASE CONTROL

[76] Inventor: Daniel Silverman, 5969 S. Birmingham St., Tulsa, Okla. 74105

[22] Filed: Oct. 18, 1973

[21] Appl. No.: 407,646

[52] U.S. Cl. .................... 340/17 R; 340/15.5 TA; 340/15.5 TS
[51] Int. Cl.² .................... G01V 1/22; G01V 1/14
[58] Field of Search .................... 181/.5 H, .5 EC; 340/15.5 FC, 15.5 TS, 15.5 TA, 17; 324/83 FB

[56] References Cited
UNITED STATES PATENTS

| | | | |
|---|---|---|---|
| 2,981,928 | 4/1961 | Crawford et al. | 340/15.5 TA |
| 2,989,726 | 6/1961 | Crawford et al. | 340/15.5 TA |
| 3,288,243 | 11/1966 | Silverman | 340/15.5 TA |
| 3,332,511 | 7/1967 | Silverman | 340/15.5 TA |
| 3,363,720 | 1/1968 | Mifsud | 340/15.5 FC |
| 3,375,896 | 4/1968 | Beddo | 340/15.5 TA |
| 3,386,525 | 6/1968 | Landrum | 340/15.5 FC |
| 3,516,510 | 6/1970 | Coburn | 340/15.5 FC |
| 3,523,277 | 4/1970 | Landrum, Jr. | 340/15.5 TA |
| 3,578,102 | 5/1971 | Ross | 340/15.5 FC |
| 3,885,225 | 5/1975 | Anstey et al. | 340/15.5 TA |

Primary Examiner—H.A. Birmiel

[57] ABSTRACT

A control system for a seismic vibrator, in which the reference, or sweep signal, drives the vibrators directly without the need to control the vibrator so that the seismic signal generated in the earth will be inphase with the reference signal. Instead, the output of one or more sensors on the vibrator are used to generate a "transmitted" signal which is representative of the seismic signal generated in the earth. The transmitted signal is used to phase-shift the reference signal to provide a counterpart signal which is inphase with the transmitted signal. The counterpart signal is used to correlate with the received seismic signal.

A plurality of vibrators may be used. They may be grouped together at one point, or they may be spaced apart at independent points. The vibrators may use the same or different reference signals, and may start simultaneously or at delayed times.

An improved sensor for mounting on the vibrator is described to provide information as to the absolute displacement of the base plate during vibrator operation.

23 Claims, 7 Drawing Figures

PARALLEL OPERATION OF SEISMIC VIBRATORS WITHOUT PHASE CONTROL

CROSS-REFERENCES TO RELATED APPLICATIONS

This application is related to my copending application Ser. No. 296,669, filed Oct. 11, 1972, entitled "Control Means for Pressure Fluid Vibrators for Generating Seismic Waves in the Earth" now U.S. Pat. No. 3,840,090.

It is also related to my copending applications Ser. No. 223,896, filed Feb. 7, 1972, entitled "Vibrator System for Generating Seismic Waves in the Earth" now U.S. Pat. No. 3,789,951, and Ser. No. 296,670, filed Oct. 11, 1972, entitled "Vibrator Systems for Generating Elastic Waves in the Earth."

BACKGROUND OF THE INVENTION

This invention lies in the field of seismic prospecting. More particularly it is concerned with seismic operations in which a long time duration vibrator input signal is imposed on the earth. Still more particularly it is concerned with vibrator operations responsive to a sweep signal of selected frequency content and time duration, in which the vibrator is driven directly from the sweep signal without the use of any auxiliary control to maintain a selected phase relation between the output of the vibrator and the sweep signal.

In the prior art, the geophysical industry has used long time duration vibrator signals to generate seismic waves in the earth. This has generally been done with multiple vibrators, usually from three or four, to as many as ten or twelve, per crew. These vibrators are placed in close proximity to each other and are driven by the same reference or sweep signal, in time and phase synchronism with each other. In order to provide this synchornism between each of the multiple vibrators, it is necessary to maintain the output of each vibrator in time and phase synchronism with its own driving sweep signal.

There is a large amount of prior art devoted to the operation of driving a vibrator from an electrical sweep signal, in conjunction with special control signals, so that the output of the vibrator will always be inphase with the electrical sweep signal. There are a number of patents issued covering apparatus designed for this purpose. Among such U.S. Nos. is 3,208,545, issued Sept. 28, 1965 in the name of W. E. N. Doty et al, entitled "Apparatus for Controlling a Seismic Vibrator," and 3,698,508, issued Oct. 17, 1972, in the name of R. W. Landrum, entitled "Phase Control of Servo Hydraulic Vibrators," and others.

In the prior art, sweep signals have been provided at the vibrator location by several means:

1. by analog radio transmission to the vibrator location from the recording location in the form of an analog sweep signal, 2. by magnetic playback of an analog signal, 3. by generating at the vibrator location a digital sweep signal and converting this digital signal to an analog signal to drive the vibrator.

The control system that serves to maintain the phase synchronism has almost exclusively been analog instrumentation, similar to that shown in the Doty patent. This generally comprises analog processing means including integrators, amplifiers, multipliers, etc. to take the output of a sensor on the vibrator base plate, and provide a signal (called for convenience, "transmitted" signal) corresponding to the seismic wave generated in the earth. It also comprises comparison means to determine an error signal between the sweep signal and the transmitted signal. And finally there is a phase shift means responsive to the error signal to convert the analog sweep signal into a phase shifted version of the sweep signal, called the drive signal, which is used to drive the vibrator.

All of this analog equipment is required at each of the vibrators solely for the purpose of maintaining a selected phase between the output of the vibrator and the sweep signal. It is costly equipment, and being analog equipment is not the optimum form of instrumentation for accomplishing the desired purpose.

SUMMARY OF THE INVENTION

It is a primary object of this invention to provide an operating system for seismic prospecting, using one or more vibrators, that does not require apparatus to phase control the vibrator.

It is another object of this invention to provide an operating seismic system with a minimum of control on the vibrator.

It is a still further object of this invention to provide an operating seismic system with a minimum of analog processing and a maximum of digitial processing.

It is a still further object of this invention to provide an operating seismic system with more precise synchronism between the signal used to correlate with the received geophone signal and the output signal of the vibrator.

It is a still further object of this invention to provide an operating seismic system in which each of a plurality of vibrators can be operated independently of each other.

It is a still further object of this invention to provide an operating seismic system wherein the travel times from each of the plurality of vibrators to each of the geophone locations can be determined independently of the other vibrators.

It is a still further object of this invention to provide an improved sensor means for generating a signal proportional to the seismic signal generated in the earth.

These and other objects are accomplished and the limitations of the prior art are overcome in this invention, in which one, or a plurality, of vibrators can be used, and in which the vibrators can be closely spaced, or more widely spaced from each other, and in which the same or different sweep signals can be used on different vibrators.

For convenience, the following definitions will be used to clarify and simplify the specification:

1. Sweep shall mean a long time duration oscillatory time function signal of selected frequency content and time duration. The frequency content may vary throughout the customary frequency range used in seismic operations, or wider range, and the time duration may be the same or different from conventional operations. The sweep signal can be in digital form or analog form, but when used to drive the vibrator, must be in analog form.

2. Reference signal is another name for sweep signal.

3. Drive signal is a time shifted and phase modified sweep signal, that is responsive to the sweep signal and to the error signal, and which, in the prior art is used to drive the vibrator.

4. Sensor signal is the analog signal that is derived from each of the one or more sensors mounted on the vibrator to provide information regarding the output of the vibrator. There are two common forms of sensors, (a) a displacement sensor connected between the piston and the cylinder of the vibrator, and (b) an accelerometer sensor mounted on the base plate of the vibrator.

5. Error signal is the signal which comprises the difference in phase between the processed sensor signal, or transmitted signal, and the sweep signal.

6. Counterpart signal is a phase shifted version of the sweep signal that is used to correlate with the received geophone signals.

7. Received signal is the amplified geophone signals, or the amplified and processed geophone signals.

8. Transmitted signal is a signal derived from one or more sensors on the vibrator, which is as close a facsimile as possible, of the seismic signal generated in the earth by the vibrator.

9. A plurality of seismic sources grouped together, means sources placed closely enough together so that their seismic waves all act as though they came from the same point.

10. A plurality of seismic sources spaced apart, are sources placed far enough apart so that their seismic waves are independent of each other.

11. Signal in the earth means the seismic wave generated in the earth, or in an overlying layer of water over the earth.

In general this seismic system provides a reference signal, which drives the vibrator directly. The base plate of the vibrator impresses on the earth a seismic wave, corresponding in general to the reference signal, but differing in time and phase from the reference signal. Appropriate sensors are mounted on the vibrator, and responsive thereto, a transmitted signal is derived which corresponds as completely as possible to the seismic wave impressed on the earth by the vibrator. The transmitted signal and the reference signal are compared to derive an error signal, which is used to phase-shift the reference signal to provide a counterpart signal, which is inphase with the transmitted signal, and, of course, with the transmitted seismic wave. The counterpart signal is then used to correlate with the received signal to determine travel times of the seismic waves.

The sensor signals are transmitted to the recording location, where there will be digital computing facilities, or to a computer facility at another location. The transmissin can be by wire, radio, or by magnetic tape, as is well known in the art. The computations involved in utilization of the sensor signals to form the counterpart signal is preferably done digitally. Thus a very precise phase control can be applied, and a precise phase relation can be provided between the seismic signal generated in the earth and the counterpart signal.

Normally a plurality of vibrators will be used. These may be grouped at a single point, or they can be widely spaced and operated independently, so that travel time can be computed from each of the vibrators individually to each of the geophone groups.

The vibrators can be driven by the same reference signal, at the same or different starting times, or they can be driven with different reference signals.

An improved sensor on the vibrator is described which provides an electrical signal which corresponds to the amplitude of base plate displacement.

BRIEF DESCRIPTION OF THE DRAWINGS

These and other objects and a better understanding of the principles and details of the invention will be evident from the following disclosure taken in conjunction with the attached drawings in which.

DESCRIPTION OF THE PREFERRED EMBODIMENTS

Figure 1:
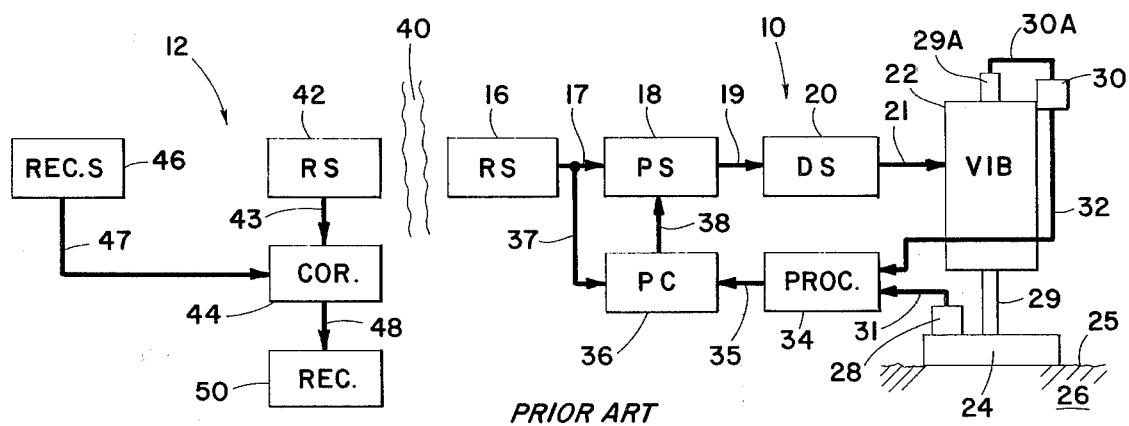
FIG. 1 represents the prior art system.

Referring now to the drawings and in particular to FIG. 1, there is shown in schematic form, the prior art system. Numeral 10 indicates generally the control system at the vibrator location, while numeral 12 indicates generally the apparatus at the recording truck or receiver location.

At the vibrator location a reference signal or sweep signal 16 is provided. This is customarily done (a) by radio transmission from the recoding location or (b) a magnetic tape recording, or (c) by computer computation of a digital sweep signal and conversion to analog signal. This reference signal is also provided simultaneously 42 at the receiver location. At the vibrator the reference signal goes from 16 via leads 17 to phase shifter 18, and in phase shifted form, via leads 19 in the form of a driver signal, or driver sweep 20. This goes via lead 21 to drive the vibrator 22, which has piston rod 29 connected to base plate 24 resting on the surface 25 of the earth 26. Not shown, but well known is the holddown means applying a force on the base plate to hold it in contact with the earth.

On the vibrator there are one or more sensors such as 28, 30. Sensor 28 is generally an accelerometer attached to the base plate. Another sensor in common usage is a displacement sensor 30 connected between the piston rod 29A and the cylinder of the vibrator. One or both of sensors 28, 30 put out signals via leads 31, 32, respectively. These go to a signal processor 34. For example, the accelerometer signal on lead 31 is generally doubly integrated to provide a displacement signal, corresponding to the seismic signal generated in the earth by the vibration of the base plate. The processor 34 may use the sensor 28 alone, or the sensor 30, alone, or some combination of the two sensor outputs.

The output of the signal processor is called a "transmitted signal," since it is the best available facsimile of the seismic signal generated. This transmitted signal goes by lead 35 to a phase comparator. Here it is compared with the reference signal on lead 37, and an error signal is determined which is a measure of the phase difference between the transmitted signal and the reference signal. This error signal goes by lead 38 to the phase shifter 18, and, dependent on the phase error signal, the reference signal is advanced or delayed to provide a corresponding driver signal, to so drive the a. they may have the same sweep or different sweeps;
b. they may start together or start independently, in which case the tape 71 of FIG. 3 will give the reference signal 78 and starting time by reference to the clock 76;

2. the vibrators can be widely separated from each other;
    a. they will generally have different reference signals;
    b. they may have same or different starting times;
    c. the travel time from each vibrator to each geophone group can be independently determined.

In any case the total energy of the system, with the same number of vibrators will be at least equal to that on the prior art system, and may be actually greater, since the phase control of the counterpart signals is inherently better than the phase control of the vibrators.

Figure 5:
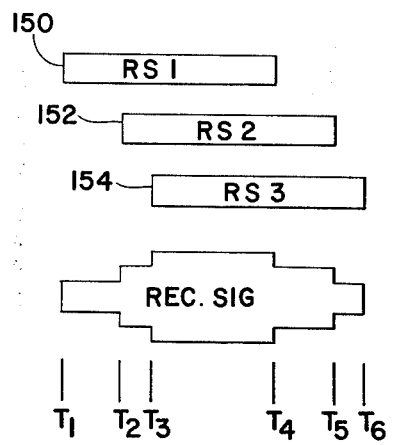
FIG. 5 shows the time occurrence of a plurality of sweeps and the corresponding received wave.

In FIG. 5 is shown in schematic form three reference signals 150, 152, 154. They are simply shown (in lines A, B, C) as envelopes, of rectangular form.
1. They may be of the same or different frequency content.
2. They may be of the same or different starting time.
3. They may be of the same or different time duration.

The received signal (or the total transmitted seismic signal 156) is shown in line D, as the sum of the three envelopes 150, 152, 154.

If the received signal D is correlated with the sum of A, B, C, this will be equivalent in energy to the prior art system. However, the received signal D can also be correlated separately with A or B or C (if they are different reference signals) to obtain independent travel times from each vibrator.

So far, nothing has been said about the sensors. Sensors 28, 30 are conventional, and are customarily an accelerometer sensor 28 on the base plate, and a displacement sensor 30 connected between the pistons and mass, or cylinder.

Figure 6:
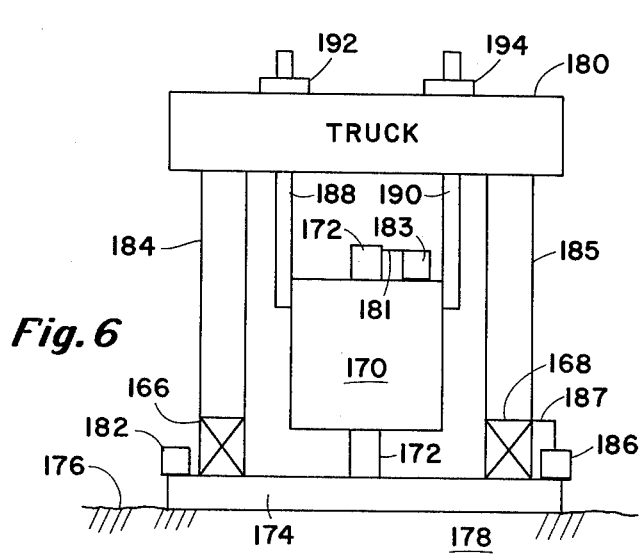
FIGS. 6 and 7 show details of an improved sensor for the vibrator system.

Shown in FIG. 6 are the two conventional sensors 282, 283 and a third sensor 186. this is a displacement sensor (which may be of the inductive type known as the inductive linear displacement sensor, and commonly used for sensor 30). It is connected across the compliance 168, which is placed between the base plate 174 and the weighting means holding it on the ground, normally the truck 180, pressing through columns 184 and 185.

Because of the great mass of the truck 180, it tends to remain stationary, being isolated by the compliances 168, 166 from the vibrating base plate. Since the truck remains fixed in space, the sensor 186 measures the absolute displacement of the base plate, which is the true measure of the force on the earth.

In my copending application Ser. No. 296,669, I point out how the force on the earth is W ± F, where W is the constant hold down force of the truck, and ±F is the oscillatory force of the vibrator. The seismic wave generated in the earth is a function of W ± F. Thus, the displacement sensor 186 is a true measure of the seismic wave generated.

Figure 7:
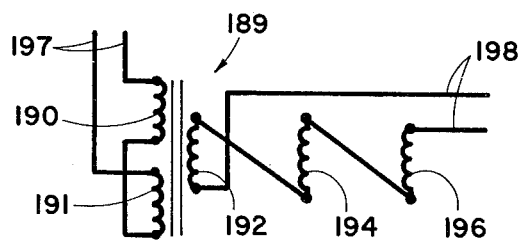

One sensor 186 can be used on one compliance, or where there are a plurality of compliances in parallel between the truck and the base plate (as is usually the case), there can be one sensor on each compliance. If so, their outputs can be added (or averaged) to provide the total sensor output. Since these sensors are inductively coupled, the outputs can be added to provide the combined signal. This is shown in FIG. 7 which shows one sensor 189 on the primary coils 190, 191 connected in opposition, from supply leads 197 and supported from column 185 by arm 187. The secondary coil 192 is supported by the base plate 174 and is connected in series with other secondary coils 194, 196 of other sensors to provide a combined output at leads 198. Sensor 186 can be used singly or in combination with sensors 182, 183.

In my copending applications Ser. Nos. 223,896 and 296,670 I describe vibrator systems in which, while the vibrator is operative, the cylinder of the vibrator is rigidly clamped to the mass of the truck. Thus, the mass of the truck becomes the reaction mass of the vibrator. Since the cylinder is now rigidly attached to the truck, as might be accomplished by welding rods 188, 190 to the cylinder 170 of the vibrator, FIG. 6, and clamping the rods 188, 190 to the truck mass 180 by clamping means 192, 194. While the clamping means 192, 194 are in effect, the sensor 183 is connected between the piston rod 172 (or base plate 174) and the cylinder 170 (or the truck 180 and columns 184, 185). For this condition the output of sensors 183 and 186 will be the same.

Figure 2:
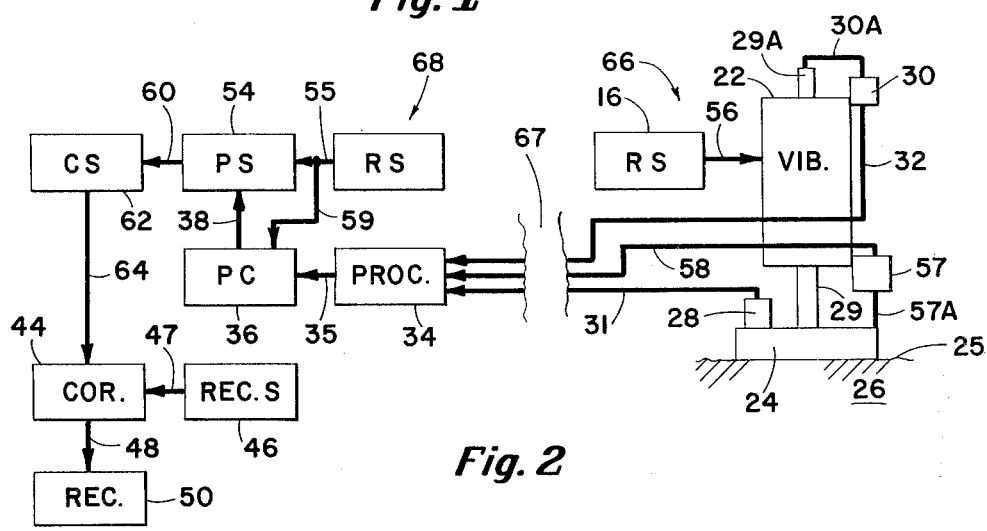
FIGS. 2 and 3 show in schematic form the improved system of the invention.
Figure 3:
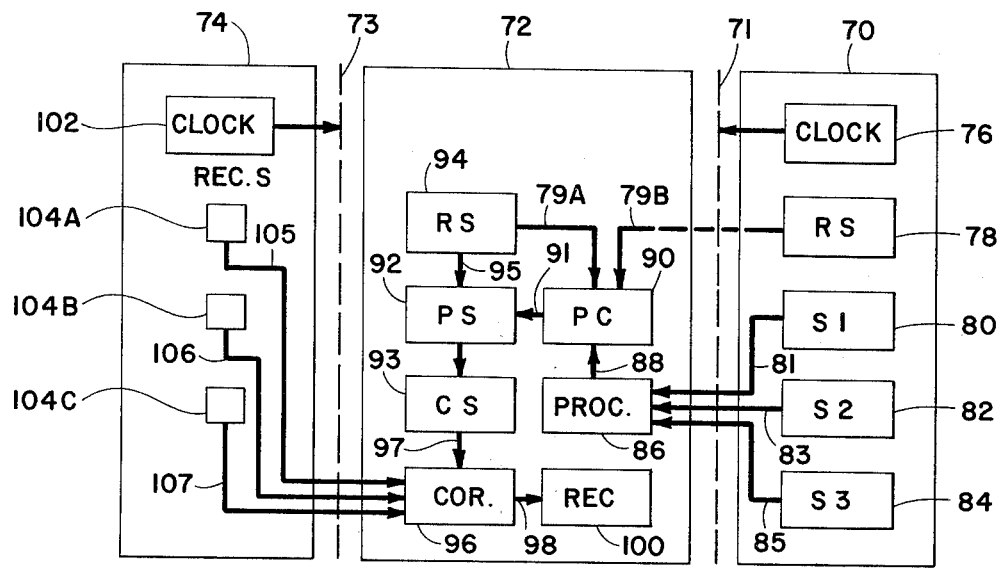

In connection with FIGS. 1, 2, 3 mention is made of the phase shifter 18, 54, 92, etc. respectively. This is terminology of the prior art analog systems, wherein the phase shifter is an analog device acting on analog signals. All such analog instruments have their weaknesses. In particular, their characteristics are far from being precisely linear, etc. On the other hand, if digital instrumentation is used, the computations can be precise.

For example, the reference signal can be calculated as a series of binary numbers corresponding to the amplitudes of the reference signal at each of a series of times, spaced apart by a selected digitizing interval. These times represent sequential counts of a clock. Thus to advance the phase of the reference signal by a desired time interval or counts of the clock, the counts of the clock are advanced by the same number of counts of the clock, or the appropriate number of digitizing intervals. The time advance or delay is precise, and the waveshape of the advanced or delayed reference signal is precise.

Figure 4:
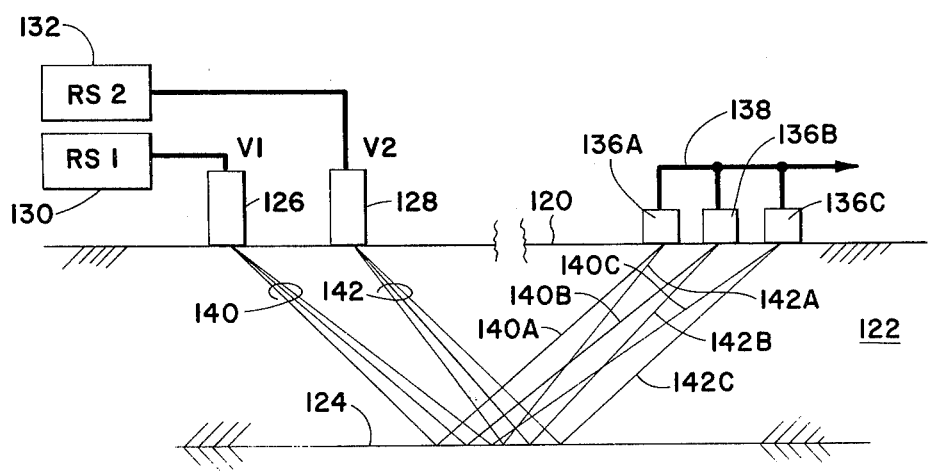
FIG. 4 represents a crosssection of the earth showing the seismic wave paths from a plurality of vibrators to a plurality of geophones.

While the systems described in FIGS. 4 and 5 are important parts of this invention, as described in conjunction with FIGS. 2, 3 it will be clear that the concept of using widely separated vibrators, spaced at distances comparable to the spacing between geophone channels, or at least a distances where the seismic waves are independent, and using different reference signals, and correlating the received signals separately with each of the different reference signals etc., can be applied equally well also to the conventional vibrator systems where the vibrators are phase controlled. Furthermore, the teachings of FIGS. 4 and 5 can be used with other long time duration oscillatory signals. Examples of such other signals might be the signals produced by air guns shot in deep water, where the bubble pulse is an oscillatory signal of long time duration. By using air guns (or explosive guns) of different chamber sizes and shapes, different bubble pulse signals will be provided, corresponding to different sweeps. Also the use of small explosive charges at depth in off shore operations provide long duration bubble pulses which correspond to sweep signals. By using different sizes of charges, or vibrator, as to make the transmitted signal inphase with the reference signal.

Normally, because of the inertia of the moving parts of the vibrator, and the compliances in the earth, etc., the response of the base plate will lag behind the reference signal. Thus, in order that the transmitted signal will be in phase with the reference signal, the phase shifter must make the driver signal lead the reference signal by the same amount that the base plate lags the driver signal. In that case the transmitted signal, and the seismic signal in the earth, will be in phase with the reference signal, and the received signal can then be correlated with the reference signal to determine the travel time of the seismic wave.

In the receiver apparatus 12 the received signal 46 detected by the geophones, and amplified, are correlated 44 with the reference signal, to provide the desired travel time information on, which is recorded at 50.

FIG. 2 illustrates in schematic form the improvement of this invention. Here the system is shown broken into two parts, part 66 covering apparatus at the vibrator location, and part 68 covering apparatus at the receiver location. The apparatus at the vibrator location comprises simply the reference signal means 16, driving the vibrator 22 through leads 56, and the vibrator 22 with piston rods 29, 29A, base plate 24 resting on the surface 25 of the earth 26. Also shown are the sensors 28, 30 providing signals via leads 31, 32 to a sensor signal processor 34. A third sensor 57 is also shown which will be further described in connection with FIGS. 6 and 7.

The signal processor 34 is optimally positioned at the recording station 66, where its signal goes by lead 35 to the phase comparator 36, which also receives the reference via lead 59. The output on lead 38 of the phase comparator 36 is the phase error signal, which goes to the phase shifter 54. The reference signal goes by lead 55 to the phase shifter 54, where it is phase shifted to provide the counterpart signal 62. The counterpart signal is now inphase with the transmitted signal, and with the seismic waves in the earth, and is correlated in correlator 44 with the received signal 46 to determine travel times of the seismic signals. The output of the correlator 44 goes by lead 48 to the recorder 50.

Comparison of FIGS. 1 and 2 will show substantially the same circuit elements, all of which are well known in the art, and need not be described further. In FIG. 1 these elements are almost entirely analog circuits, and each of the plurality of vibrators (from three to ten or more) which are used, requires a full set of circuit elements. In FIG. 2, the circuit elements are shown at the receiver location. With the current trend to providing mini-digital-computers at the recording truck, all of the circuit elements can be digital. This not only provides a more precise calculation, which can be precisely programmed, but the computer can be used to multiplex the signals from all of the vibrators, with a consequent great saving in apparatus.

In FIG. 3 is shown a more general circuit in which the apparatus at the vibrator box 70 comprises the reference signal means 78 and the motion sensors 80, 82, 84, etc. Numeral 71 indicates a transmission means, which can be, wires, radio, or magnetic recording and playback.

Box 74 indicates the apparatus at the receiver station, namely the geophones, amplifiers 104, all of which can be conventional. Again, the numeral 73 represents a transmission means which again can be wires, radio, or magnetic tape. Both boxes 70, 74 are shown to include clocks 76, 102. These are precise counters and are synchronized, by means well known in the art, such as by a coded radio signal, etc. They are used as time references on the magnetic tapes 71, 73 (if used).

THe middle box 72 is a computer section. This can be at the recording truck, for example, or can be a central computer for processing the seismic data. If box 72 is at the recording truck, the seismic amplifiers would be in box 72, and the transmission of the geophone signals would be over cables 105, 106, 107, etc. In this case also, the clock 102 would not be needed, or would be included in box 72.

In box 72, reference signal 94 would be provided either as a duplicate source to those 78 at the vibrators, or conversely, would be read from the tape 71. It will be remembered also that while only one box 70 is shown, there will be one such box for each vibrator. Also each vibrator reference signal, as will be explained below, may be a different reference signal, either in frequency content, in time duration, or in starting time.

Inside the box 72, there will be, as in FIG. 2, sensor processor means 86, phase comparator means 90, phase shift means 92, and counterpart signal means 93. The counterpart signal will be inphase with the transmitted signal, and can be correlated 96 with the received signals 105, 106, 107, and the result recorded in 100.

The advantages of the systems of FIGS. 2 and 3 over that of FIG. 1 are, among others:

a. less equipment is used since only a single multiplexed processor, or computer processor, is required instead of a plurality of complete analog systems;

b. the computing and processing apparatus can be digital in place of analog as in the prior art, for greater precision;

c. there is no requirement that the phase of the vibrator be controlled, thus, there is no need to subject the vibrator to transient signals, as is customary in the phase controlled operations. This means less stress and strain on the vibrators and consequent longer life and less maintenance;

d. the instrumental apparatus at the vibrator, where it is normally poorly maintained, is reduced.

Referring now to FIG. 4, there is shown a seismic system in which the improved instruments of FIGS. 2 and 3 can be used. Shown are two vibrators 126, 128 pressed to the earth 122 by conventional hold down means. Each vibrator is provided with a reference signal 130, 132, respectively. These put separate seismic signals into the earth as shown by rays 140, 142. These travel down in the earth to a reflecting interface 124, and are reflected back to the surface as rays 140A, 140B, 140C, etc. and 142A, 142B, 142C, etc. to geophones 136A, 136B, 136C, etc. resting on the surface 120 of the earth 122.

In the conventional prior art systems the vibrators 126, 128 must be close together so that the rays 140, 142 emanate from substantially the same point. And, of course, in the conventional system each vibrator must have the same reference signal or sweep, the reference signals must all start simultaneously, and the vibrators must be phase controlled.

In this system there are several possible modes of operation;

1. the vibrators are at the same location, or same point on the earth;

multiple charge groups with delayed detonation, the signals produced would correspond to those of FIG. 5.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed is:

1. A system for carrying out seismic operations using an electrically controlled first vibrator to generate a seismic signal in the earth at a first point, said seismic signal of selected frequency content and time duration, and including means at a recording station, at a second point on the earth spaced from said first point, to detect said seismic signal and produce a received signal, comprising:
   a. means to produce a first reference signal at said first point, and means to drive said first vibrator in accordance with said first reference signal;
   b. means to produce a first transmitted signal which is a function of the seismic signal generated in the earth by said first vibrator at said first point and wherein said first transmitted signal varies in phase from said first reference signal;
   c. means at said second point to detect said seismic signal after transmission through the earth and to produce a received signal;
   d. means responsive to said first reference signal and said first transmitted signal to generate a first counterpart signal which is substantially in phase with said first transmitted signal; and
   e. means to correlate said received signal with said first counterpart signal.

2. The system as in claim 1 including:
   a. means to produce a second reference signal at a third point, spaced from said first and second points;
   b. means to drive a second vibrator at said third point in accordance with said second reference signal;
   c. means to produce a second transmitted signal which is a function of the seismic signal generated in the earth by said second vibrator at said third point;
   d. means responsive to said second reference signal and said second transmitted signal to generate a second counterpart signal which is substantially in phase with said second transmitted signal.

3. The system as in claim 2 including means to correlate said received signal with said second counterpart signal.

4. The system as in claim 2 including means to correlate said received signal with the sum of said first and second counterpart signals.

5. The system as in claim 1 in which said means to generate said first counterpart signal comprises;
   a. means to compare said first transmitted signal and said first reference signal to produce a first phase error signal; and
   b. means responsive to said first phase error signal to generate a first counterpart signal which is substantially inphase with said first transmitted signal.

6. A seismic prospecting system comprising:
   a. means to generate a first oscillatory time function of ground motion in the earth, responsive to a first reference signal, of a first selected frequency content, starting time and time duration at a first point on the earth,
   b. means to provide a first electrical signal facsimile of said first oscillatory time function of ground motion in the earth at said first point, and wherein said first facsimile signal varies in phase from said first reference signal due to vibrator phase shift;
   c. means to generate a second oscillatory time function of ground motion in the earth, responsive to a second reference signal of a second selected frequency content, starting time and time duration at a second point on the earth;
   d. means to provide a second electrical signal facsimile of said second oscillatory time function of ground motion in the earth at said second point, and wherein said second facsimile signal varies in phase from said second reference signal due to vibrator phase shift; and
   e. means at a third point on the earth spaced from said first and second points to detect the first and second seismic waves generated by said first and second ground motions after travel through the earth, and means to form a received signal.

7. The system as in claim 6 including means to correlate said received signal with the sum of said first and second facsimile signals.

8. The system as in claim 6 including means to correlate said received signal separately with each of said first and second facsimile signals.

9. A vibrator-type seismic system as in claim 1, including at least one vibrator, said vibrator having a base plate in contact with the earth, and including weighting means pressing down on said base plate through at least one compliance with a steady force W, said vibrator generating an alternating force F, and including means to generate an electrical signal which is a function of the seismic wave generated in the earth by said vibrator corresponding to the Force $W \pm F$, and including linear displacement sensor means connected between the ends of said comliance, said sensor providing an electrical signal which is a function of the distance between said ends.

10. The system as in claim 9 including a plurality of compliances connected in parallel between said weighting means and said base plate and including one sensor connected across each compliance.

11. The system as in claim 10 in which the output signal from said sensor group is proportional to the average signal of said plurality of sensors.

12. The system as in claim 9 including means responsive to said first reference signal and said electrical signal to generate sid first counterpart signal.

13. The system as in claim 6 in which said second point is spaced from said first point.

14. The system as in claim 6 in which said second point is close to said first point.

15. The system as in claim 6, including:
   a. means responsive to said first reference signal and said first facsimile signal to generate a first counterpart signal which is inphase with said first facsimile signal; and
   b. means responsive to said second reference signal and said second facsimile signal to generate a second counterpart signal which is inphase with said second facsimile signal.

16. The system as in claim 15 including means to correlate said received signal with the sum of said first and second counterpart signals.

17. The system as in claim 15 including means to correlate said received signal separately with each of said first and second counterpart signals.

18. The system as in claim 6 in which said first reference signal is different from said second reference signal.

19. The system as in claim 6 in which said first and second reference signals are the same but their starting times are different.

20. The system as in claim 6 in which the time durations of said first and second reference signals overlap in time, and said means to detect simultaneously, detects the sum of said first and second seismic waves.

21. The system as in claim 6 in which the time durations of said first and second reference signals are widely separated, whereby said means to generate generates a first received signal corresponding to said first seismic wave, and a second received signal corresponding to said second seismic wave.

22. The system as in claim 21 and claim 15 and including means to correlate the sum of said first and second received signals with the sum of said first and second facsimile signals.

23. A system for carrying out seismic operations using an electrically controlled first vibrator to generate a seismic signal in the earth at a first point, said seismic signal of selected frequency content and time duration, and including means at a recording station, at a second point on the earth, spaced from said first point, to detect said seismic signal and produce a received signal, comprising:
 a. means to produce a first reference signal at said first point, and means to drive said first vibrator in accordance with said first reference signal;
 b. means to produce a first transmitted signal which is a function of the seismic signal generated in the earth by said first vibrator at said first point;
 c. means at said second point to detect said seismic signal after transmission through the earth and to produce a received signal;
 d. means responsive to said first reference signal and said first transmitted signal to generate a first counterpart signal which is substantially in phase with said first transmitted signal; and
 e. means to correlate said received signal with said first counterpart signal; and wherein said means to generate said first counterpart signal comprises;
 f. means to compare said first transmitted signal and said first reference signal to produce a first phase error signal; and
 g. means responsive to said first phase error signal to generate a first counterpart signal which is substantially in phase with said first transmitted signal.

* * * * *